UNITED STATES PATENT OFFICE.

WALTER S. HILL, OF BOSTON, MASSACHUSETTS.

FIREPROOF PAINT.

SPECIFICATION forming part of Letters Patent No. 484,714, dated October 18, 1892.

Application filed January 28, 1892. Serial No. 419,564. (No specimens.)

*To all whom it may concern:*

Be it known that I, WALTER S. HILL, of Boston, county of Suffolk, State of Massachusetts, have invented a new and useful Fireproof Paint, of which the following is a specification.

The object of my invention is a paint which is substantially fireproof, a non-conductor of heat and electricity, and is adapted for outside or inside work, either plain or ornamental.

The invention consists in a composition, with the ingredients of oil-paint, of zinc hydrate, an alkaline salt, and some substance which is a non-conductor of heat and electricity, as hereinafter set forth.

To obtain the zinc hydrate and alkaline salt I prefer to mix with a solution of zinc chloride ammonium hydrate in the proportions of about eighty pounds of the former, having a specific gravity of 1.611, to thirty-five pounds of the latter, having a specific gravity of .8974. A double decomposition results by which zinc hydrate is formed and separates as a white gelatinous mass while ammonium chloride remains in solution. To this composition I add, preferably, about twenty pounds of powdered asbestus and the ingredients of an oil-paint, such as and in these proportions: five gallons of linseed-oil, fifty pounds of white lead, and a pigment, if required, of the desired nature and quantity. The mass is thereafter suitably ground, as in an ordinary paint-mill. To get the proper consistency, spirits of turpentine may be added, as with other paints.

Suitable zinc hydrate and alkaline salt may be obtained by double decomposition by means of other chemicals than those named above. Thus zinc chloride and sodium hydrate, commonly known as "caustic soda," combined will form zinc hydrate and sodium chloride. Zinc chloride and potassium hydrate combined will form zinc hydrate and potassum chloride. Zinc chloride and calcium hydrate, generally known as "slaked lime," will give zinc hydrate and calcium chloride. It is not necessary to be restricted to the use of zinc chloride to obtain zinc hydrate, as other salts of zinc will answer, such as zinc sulphate, zinc acetate, &c., and in connection with the same the alkaline salt, both products being formed simultaneously by the action of an alkaline hydrate on the zinc salt. Thus zinc chloride, zinc sulphate, or zinc acetate brought into chemical combination with either the hydrate of ammonium, sodium, potassium, calcium, magnesium, &c., will produce a zinc hydrate and an alkaline salt. A zinc hydrate and an alkaline salt, which may be obtained as above set forth, and is well known to the chemist, may enter into the composition of a paint which will embody my invention to a more or less perfect degree. In place of asbestus any non-conducting material will answer, such as gypsum, infusorial earth, clay, &c., such material being, mainly, to form a fireproof body for the paint. The zinc hydrate and alkaline salt are, however, of greater utility in rendering the paint fireproof, since when the paint is exposed to the flames the water in chemical combination in the zinc hydrate vaporizes and serves to exclude the heat, and thereupon the alkaline salt volatilizes, so that the fused mass expands to form a fireproof coating of considerable thickness, which resists further action of the heat on the article to be protected. The other ingredients, which are those of an oil-paint, may, of course, be such and in such proportions as are required for the work, and may be readily determined by those given in the special composition hereinbefore set forth and the knowledge of one skilled in the art of mixing paints.

The chief advantages of this composition are that by it a paint may result that is fireproof, waterproof, and an insulator of electricity. It will render wood, canvas, &c., waterproof and comparatively incombustible, and can be used with good results on outside as well as inside work. It will dry as quickly as ordinary paint and be as hard, and, since it closely represents such paint, it may be used for ornamental purposes.

I claim as my invention—

1. The herein-described paint, composed of zinc hydrate, an alkaline salt, a non-combustible material, and an oil-paint, substantially as specified.

2. The herein-described paint, composed of zinc hydrate, an alkaline salt, a non-combustible substance, white lead, and linseed-oil, substantially as specified.

3. The herein-described paint, composed of zinc hydrate, an alkaline salt, asbestus, white lead, linseed-oil, and a pigment, substantially as specified.

WALTER S. HILL.

Witnesses:
RALPH BARTLETT,
EDW. DUMMER.